United States Patent [19]

Ugon

[11] Patent Number: 4,795,893

[45] Date of Patent: Jan. 3, 1989

[54] SECURITY DEVICE PROHIBITING THE FUNCTION OF AN ELECTRONIC DATA PROCESSING UNIT AFTER A FIRST CUTOFF OF ITS ELECTRICAL POWER

[75] Inventor: Michel Ugon, Maurepas, France

[73] Assignee: Bull, CP8, Paris, France

[21] Appl. No.: 71,882

[22] Filed: Jul. 10, 1987

[30] Foreign Application Priority Data

Jul. 11, 1986 [FR] France .................... 86 10208

[51] Int. Cl.$^4$ ............................................. G06K 3/00
[52] U.S. Cl. ................................................. 235/382
[58] Field of Search ....................................... 235/382

[56] References Cited

U.S. PATENT DOCUMENTS 3,906,460 9/1975 Halpern ......................... 235/382
4,105,156 8/1978 Dethloff .

FOREIGN PATENT DOCUMENTS 0027425 4/1980 European Pat. Off. .
0070199 1/1983 European Pat. Off. .
8504035 9/1985 World Int. Prop. O. .

Primary Examiner—Harold I. Pitts
Attorney, Agent, or Firm—Kerkam, Stowell, Kondracki & Clarke

[57] ABSTRACT

The invention relates to a security device (1) prohibiting the execution of at least one function of an electronic data processing unit (2) after a first cutoff of its electric power even in the case of a resumption of supply voltage.

This device includes a first means (8) that functions only once in the course of a period beginning at the instant ($T_0$) of a first connection to voltage by the power supply (3), and finishing prior to the instant ($T_2$) of a first cutoff of this power supply, and a second means (10) connected to the output of the first means (8) and furnishing an inhibiting signal having a first level that authorizes the function of the unit, from the instant ($T_0$) of the first connection to voltage until the instant ($T_2$) of the first cutoff, this inhibiting signal having a second level that prohibits said execution of said function beginning at the instant ($T_2$) of the first cutoff, this inhibiting signal maintainin this second level even in the case of a resumption of voltage.

13 Claims, 1 Drawing Sheet

SECURITY DEVICE PROHIBITING THE FUNCTION OF AN ELECTRONIC DATA PROCESSING UNIT AFTER A FIRST CUTOFF OF ITS ELECTRICAL POWER

The present invention relates to a security device that prohibits the execution of at least one function of an electronic data processing unit after a first cutoff of its electrical power.

BACKGROUND OF THE INVENTION

This device applies more particularly to electronic data processing units integrated with semiconductors, including volatile components for the storage of data or programs, or for the processing of signals or information, for example such as credit cards having integrated microprocessors. These units may also be made up at least partly by digital counters, or may include quartz clocks.

Electronic data processing units that include volatile memories (such as RAM) have the disadvantage that they lose all the information contained in these memories in the absence of a source of electrical power. This is true for instance for credit cards of the electronic type, which include an integrated microprocessor associated in particular with such memories.

The same disadvantage is found in more conventional electronic units, such as the aforementioned counters, which except for the digital display apparatus are in the form of integrated circuits having multivibrators as their primary components. When these components are connected to voltage, their initial state is always the same, because a reset to zero takes place whenever such counters are reconnected to voltage.

In an integrated electronic unit such as a credit card having a microprocessor and a volatile memory, it may be necessary for reasons of security, especially when the cell or battery that supplies the unit is contained within the card, to prevent any resumption of function of the card when the cell or battery that supplies the integrated electronic unit contained in this card has been taken out (thus causing a cutoff of electrical power) and then put back so as to reconnect the electronic unit to voltage. When this card is used for instance to withdraw money from a cash distributing bank terminal, the card holder must first make his personal access code known, so that the withdrawal can be authorized by the processing system that is connected to the terminal. Typically, the card includes an integrated counter that memorizes the number of attempts made by the card holder to indicate his personal access code to the terminal. The number of attempts at introducing the access code is limited in a predetermined manner, such that after a predetermined number of unsuccessful attempts, the card is retained by the terminal, since the counter has reached the predetermined number that is not to be exceeded. The holder, now having lost his card, must consult with the bank to recover it.

In the case where the card holder is a defrauder, who since he does not know the exact access code would like to make a great number of successive attempts to discover the access code without allowing the counter to play its role in security, it would be possible for him to remove or disconnect the battery or power cell of the electronic data processing unit of the card, so that the cutoff of power would automatically reset the counter to zero. Once this reset to zero has been done, the defrauder need merely replace the cell to resupply power to the electronic unit of the card and to gain access successfully each time to the internal memories, since the access code will have been reset to the initial known state; the cell can be removed again before the predetermined number of attempts that is not to be exceeded, and which is recorded by the counter, has been reached, and so on.

It is clearly important in this case to provide a security device that prohibits the execution of one or more functions, or even the entire functioning of the electronic data processing unit carried by the card, after any initial cutoff of the power supply to this electronic unit.

Another example where the role of such a security device can be important is that of an integrated electric counter that records the distances traveled by a vehicle. If the power supply to this counter is autonomous and integrated with the counter, a defrauder might be tempted to cut the power to reset the counter to zero. The resumption of voltage to the counter would then enable the defrauder to begin again, much more advantageously, in terms of the evidence of the distance traveled, especially when he wants to sell his vehicle.

Another example of an electronic data processing unit for which a security device that prohibits its functioning is desirable is one in which the electronic unit includes a quartz clock, the functioning of which is no longer assured as soon as the internal electric power source becomes defective. In this case, the time base fixed by the quartz clock goes awry without the knowledge of the user of the electronic unit, and this may have very important consequences if the electronic unit is for instance one that furnishes standard measures. In that case, it is useful to prohibit the function of the unit if the clock power supply has been cut off and then resumed, so that the user will be informed of the cutoff and will recalibrate the unit.

At the present time, no reliable security devices having a simple structure and low cost, and which enable prohibiting the function of one or more functions of an electronic data processing unit, or even the function of the unit, after a first cutoff of its power supply and a subsequent resumption of voltage to the unit, are known.

OBJECT OF THE INVENTION

The object of the invention is to overcome this lack and in particular to provide a security device that prohibits the execution of at least one function of an electronic data processing unit, after a first cutoff of its electric power and then a resumption of supply voltage, and that is reliable, simple in structure, inexpensive and highly secure.

The subject of the invention is a security device prohibiting the execution of at least one function of an electronic data processing unit after a first cutoff of its electric power by [sic]a resumption of supply voltage, characterized in that it includes:

a first means that functions only once in the course of a period beginning at the instant of a first connection to voltage by the power supply, and furnishing [sic]prior to the instant of a first cutoff of this power supply, this first means furnishing, at an output in the course of this period, a signal characteristic of the functioning of this first means;

a second means, one input of which is connected to the output of the first means for memorizing the characteristic signal from the instant of first connection to voltage until the instant of a first cutoff, this second means being connected via one output to the electronic data processing unit furnishing at this output an inhibiting signal having a first level that authorizes the function of the unit, from the instant of the first connection to voltage until the instant of the first cutoff, this inhibiting signal having a second level that prohibits the execution of the function beginning at the instant of the first cutoff, the inhibiting signal maintaining this second level even in the case of a resumption of voltage.

In another characteristic, the first means is a circuit with static components, one of the components being destroyed at the end of said period by means internal or external to this circuit.

In another characteristic, the second means includes a circuit for memorization of said characteristic signal, connected to the first means, and an inhibiting circuit connected to the memorization circuit and to the first means and furnishing said inhibiting signal at one output.

In another characteristic, the device further includes a means for cancelling the prohibition of the execution of the function, this cancellation means having one output connected to the input of the second means, the cancellation means furnishing an output signal exhibiting said first level when it is desirable to enable the execution of said function after a resumption of voltage to the apparatus after a cutoff, the cancellation means including at least one input for receiving a coded signal, upon the reception of which the output signal of the cancellation means exhibits the first level.

In another characteristic, the memorization circuit is a multivibrator of the master-slave type.

In another characteristic, the memorization circuit includes one or more volatile memories.

In another characteristic, the component that is destroyed at the end of said period is a component destroyed by a laser beam.

In another characteristic, the component that is destroyed at the end of said period is a component destroyed by an excessive intensity of current passing through it.

In another characteristic, the component that is destroyed at the end of said period is a component destroyed by mechanical action.

In another characteristic, the power supply of the apparatus and of the device is a cell or a battery.

In another characteristic, the apparatus is a microcircuit card, one of these microcircuits comprising one or more volatile memories.

In another characteristic, at least one of the volatile memories of the apparatus comprises the memorization circuit of the second means.

Finally, in another characteristic, the cell or battery is carried by the card.

BRIEF DESCRIPTION OF THE PREFERRED EMBODIMENT

The characteristics and advantages of the invention will become more apparent from the ensuing description, taken in conjunction with the accompanying drawings, in which:

FIG. 1 is a schematic representation of a security device according to the invention; and FIG. 2 is a flow chart of the essential signals that arise in the functioning of this security device.

DESCRIPTION OF THE PREFERRED EMBODIMENT

Figure 1:
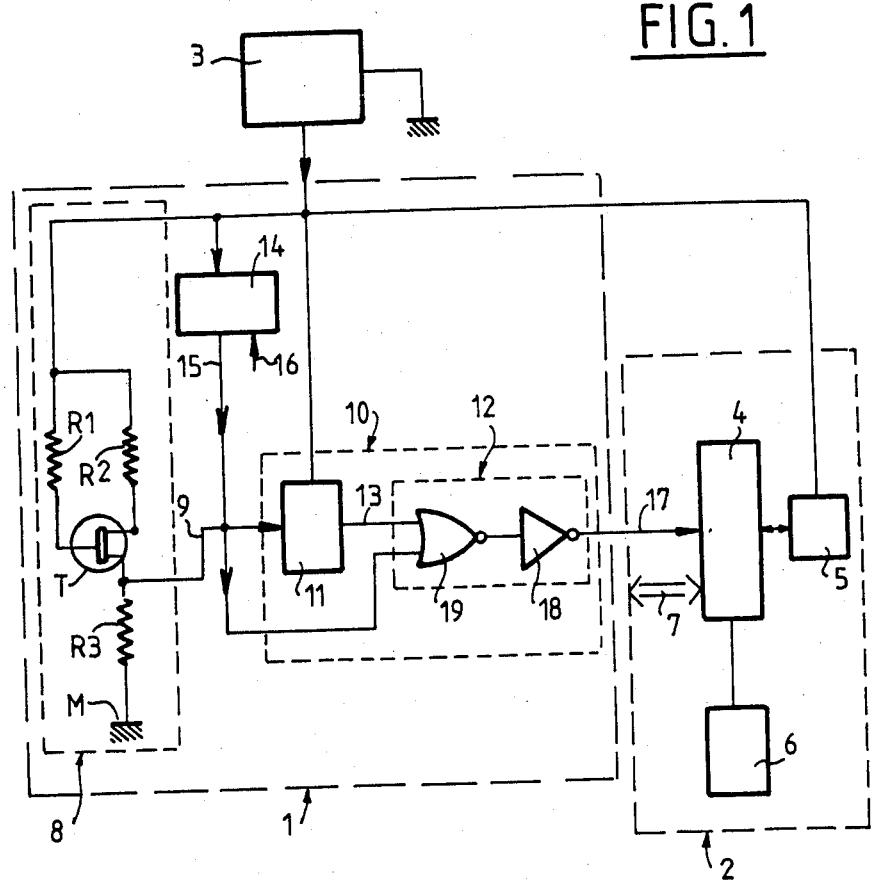

The security device 1 shown schematically in FIG. 1 permits prohibiting the execution of at least one function of an electronic data processing unit 2, after a first cutoff of its electric power supply 3 and a subsequent resumption of voltage. The electronic unit 2 shown as an example in this figure may for instance be an integrated microprocessor 4, associated with a read-write memory (RAM) and a read-only memory 6. In this exemplary application of the safety device, it is supposed that the electronic unit 2 is for example a credit card, and that the electronic unit 2 and the security device 1 are integrated with and contained in the card. It is also supposed that the electric power supply 3, which may be a cell or a battery, is also contained in or carried by the card.

It is apparent that the electronic unit 2 may instead be a quite different device, such as a distance counter, an apparatus for clock-controlled measurements, and so forth. In the case where the electronic unit 2 is a credit card, for example, the input/output bus has been shown at 7, by which the microprocessor 4 of this card can communicate with a bank terminal.

The security device 1 includes a first means 8 that functions only once during a period of time beginning at the instant of a first connection to voltage by the power supply 3, and finishing prior to the instant of a first cutoff of this power. As will be described in detail hereinafter, this first means furnishes a signal characteristic of its functioning at an output 9 in the course of this period of time.

The device 1 also includes a second means 10 connected to the output of the first means 8 and intended for memorizing the characteristic signal furnished by the first means, from the instant of the first connection with voltage by the power supply 3 until the instant of a first cutoff. As will be described in detail hereinafter, this second means furnishes at its output 17 an inhibiting signal that is at a first level from the instant of the first connection to voltage until the instant of the first cutoff. This inhibiting signal exhibits a second level, beginning at the instant of the first cutoff, and it maintains this second level, even in the event of a resumption of voltage to the electronic unit and to the security device 1 via the power supply 3. The inhibiting signal, when it is at the first level, authorizes the functioning of the electronic unit; when it is at the second level, it prohibits the execution of at least one function of this unit.

In another embodiment of the device according to the invention, the device also includes a means 14 for cancelling the prohibition of the execution of at least one function of the electronic unit 2 when the inhibiting signal is at the second level. This cancellation means has an output 15 which is connected to the input of the second means 10. As described hereinafter in detail, it furnishes an output signal exhibiting a first level whenever it is desirable, after a resumption of voltage to the apparatus that follows a cutoff, to cancel the prohibition of the execution of the function in question. This cancellation means includes at least one input 16 that enables reception of a coded signal, upon the reception of which the output signal of this cancellation means exhibits the level of the characteristic signal prior to a first cutoff, which thus permits the electronic unit to function once again, without inhibition of one or more of its functions. The means 14 may comprise the microprocessor 4, which itself receives the coded signal via the interface circuit 7. In that case, the microprocessor 7 [sic]may have a specific output connected directly to the output 15. The first means 8 may comprise a switching circuit using a transistor T of the MOS type, the gate and drain of which are for example connected respectively to the output of the power supply source 3, via resistors $R_1$, $R_2$; the source of the transistor T is connected to a reference ground M via a resistor $R_3$ and comprises the output 9 of the first means 8. The second means 10 includes a memorization circuit 11, for example comprising a multivibrator of the R/S type, controlled by the output signal of the first means and connected to the power supply 3. In the case where the electronic unit of which it is desired to prohibit the execution of at least one of its functions, or its entire functioning, after a first cutoff of the power supply 3 is a microprocessor associated with memories, the memorization circuit 11 may perhaps comprise one or more memory cells 5 of the microprocessor 4 (RAM).

The second means also includes an inhibiting circuit 12, connected to the memorization circuit 11 and to the output 9 of the first means 8. This inhibiting circuit includes a NOR gate 19, the inputs of which are connected to the output 9 of the first means and to the output 13 of the memorization circuit, respectively. The output of this gate is connected to an inverter 18, the output of which comprises the output 17 of this inhibiting circuit as well as the output of the second means 10. This output furnishes the above-mentioned inhibiting signal. This signal is capable of prohibiting the execution of at least one function of the electronic unit, but it can also prohibit all functioning of this unit, for example by acting upon a switching device that cuts off the power supply to the entire unit, even if this power supply has been resumed after a cutoff.

Figure 2:
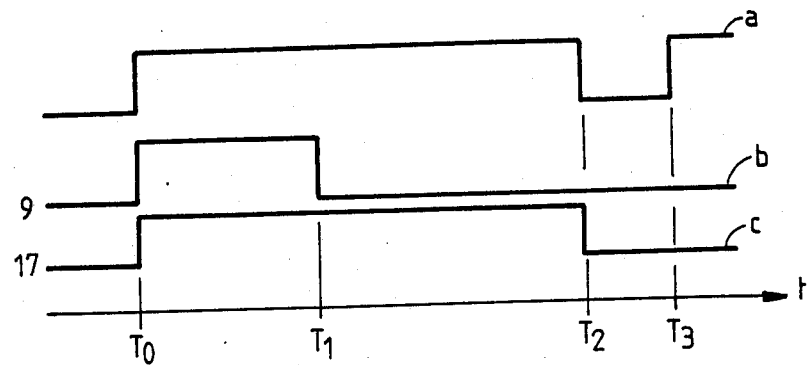

The functioniong of the device will now be described in greater detail, referring to FIG. 2.

This figure shows, at (a), the variations in the level of the output voltage of the power supply 3, in the course of the time t; at (b), the signal appearing at the output 9 of the first means; at (c) the signal at the output 17 of the second means 17, or at the output 13 of the memorization circuit 11.

The first time the device 1 and the electronic unit 2 are connected to voltage by the power supply 3 is shown in the diagram (a) at the instant $T_0$. This connection to voltage ceases at the instant $T_2$ of a first cutoff. In the case of a credit card having a microprocessor, for example, this first cutoff may be caused by the removal of the cell or battery 3.

The first means 8 functions only during a period that, as diagram (b) shows, begins at the instant $T_0$ when voltage is first suppled by the power supply 3, and ceases at an instant $T_1$ prior to the instant $T_2$ of a first cutoff of the power. The first means 8 furnishes at its output 9, in the course of this period $T_1$-$T_0$, a signal that is characteristic for the functioning of the first means, as shown in the diagram (b). In fact, the signal at the output 9 of the first means 8 is at a first level (the level of logical 1, for example) during the period $T_1$-$T_0$, while outside this period $T_1$-$T_0$ this signal is at a second level (the level of logical 0).

As indicated above, the first means 8 is a switching circuit, which includes only static components. To make the functioning of this circuit stop at the instant $T_1$, one of the components of this circuit may be destroyed at that instant. This destruction may be internal or external to the circuit of the first means. External destruction, for example, may be done by subjecting the resistor $R_2$ to a laser beam, or by subjecting this resistor to some mechanical action (such as severing) that destroys it, before the card is delivered to its final owner. Destruction by internal means to the circuit can be brought about for example by excess current, causng thermal dissipation and causing a break in the connection between the drain of the transistor 7 and the resistor $R_2$, which in either case definitively connects the output 9 to the ground of the circuit.

At the instant $T_0$, the second means 10 and in particular the memorization circuit 11 memorizes the characteristic signal furnished by the first means, until the instant $T_2$ of a first cutoff. At its output 17, between the instant $T_0$ of the first connection to voltage and the instant $T_2$ of the first cutoff, this second means furnishes an inhibiting signal, such as that shown in the diagram (c). This signal exhibits a first level (the level of logical 1) between the instants $T_0$ and $T_2$, while beginning at the instant $T_2$ of the first cutoff, it exhibits a second level (logical 0). Beginning at the instant $T_2$ corresponding to a first cutoff, for example because the battery or cell 3 has been removed, the output signal of the second means 10 maintains its second level (logical 0), even if at the instant $T_3$ (diagram (a)), the cell or battery 3 has been put back into place, thus causing a resumption of voltage to the device 1 and to the electronic unit 2.

The inhibiting circuit 12, which includes a NOR gate followed by an inverter, furnishes at its output 17 a signal such as that shown in diagram (c). This signal is at the first level (logical 1) between the instant $T_0$ of the first connection to voltage and the instant $T_2$ of the first cutoff. This signal remains at the second level (logical 0) even if at instant $T_3$ the cell or battery 3 that supplies power to the device and to the electronic unit 2 has been replaced. As a result, between the instants $T_0$ and $T_2$ the inhibiting circuit 12, which is connected to the electronic unit 2, furnishes a signal that authorizes the functioning of the electronic unit 2. Beginning at the instant $T_2$, the inhibiting circuit furnishes a control signal that is at the second level and that pfohibits the execution of at least one of the functions of this unit, or of all its functions. This prohibition remains even if after this first cutoff, the battery or cell 3 is replaced by instant $T_3$.

The signal furnished by the inhibiting circuit 12 is the same as that furnished by the memorizing circuit 11. The inhibiting circuit 12 is actually an interface circuit between the security device and the electronic unit.

In the case of a credit card having a microprocessor, the inhibiting signal having the level of logical 0, which is furnished by the inhibiting circuit 12 after any cutoff of the power supply 3, is capable of prohibiting all the functions, for example, of the unit 2, or simply certain of the essential functions of this unit, making it unusable by a defrauder.

In the case of a distance counter in a vehicle, the security device for example prohibits the restarting of the counter if the cell or battery 3 supplying it with power has been removed or disconnected. It is thus possible to determine that a fraud has been committed.

In the case of an electronic unit that functions on the basis of clock pulses, the device makes it possible to prohibit restarting of the clock whenever its power supply has been removed or disconnected.

In the other embodiment, the means 14 for cancelling the prohibition of execution of one or more functions of the electronic unit 2 is connected to the input of the second memorizaton means 10 and to the power supply 3. At its output, this cancellation means furnishes a cancellation signal which can be applied to the input of the second memorization means 10 after a first cutoff and an ensuing resumption of voltage to the device and to the electronic unit. This cancellation signal is equivalent to the characteristic signal furnished by the first means 8. It is understood that this cancellation signal may cause a coded signal to be applied to the input 16 of the cancellation means, this signal causing the appearance at the output 15 of the cancellation signal exhibiting the first level (the level of logical 1). The coded signal may be applied by appropriate means, by a user who is not a defrauder and wishes to restart the function of the electronic unit 2 after inhibition of one or more of the functions of this unit by the device following a cutoff of the power supply 3.

What is claimed is:

1. A security device adapted to be connected to a power supply and being operative connected for (1) prohibiting execution of at least one function of an electronic data processing unit (2) after a first cutoff of its supply voltage even in the case of a resumption of supply voltage, comprising:

first circuit means (8) connected for operatively functioning only once in the course of a period beginning at the instant ($T_0$) of a first connection to voltage by the power supply (3), and ceasing its functioning prior to the instant ($T_2$) of a first cutoff of this power supply, first means having an output (9) and furnishing at said output (9) in the course of this period, a signal characteristic of the functioning of said first means;

second circuit having at least one input and at least one output (17), said means (10) one input being connected to the output (9) of the first means (8), said second input means being operatively connected for memorizing a characteristic signal from the instant ($T_0$) of first connection to said voltage until the instant ($T_2$) of a first cutoff, said second means (10) being connected via one output (17) to an electronic data processing unit (2) and furnishing at said output (17) an inhibiting signal having a first level that authorizes the function of the unit, from the instant ($T_O$) of the first connection to voltage until the instant ($T_2$) of the first cutoff, said inhibiting signal having a second level that prohibits said execution of said function beginning at the instant ($T_2$) of the first cutoff, this inhibiting signal maintaining this second level even in the case of a resumption of voltage of the power supply.

2. A device according to claim 1, wherein the first means (8) is a circuit with static components, and destruction means for destroying one of the static components at the end of said period.

3. A device according to claim 1, wherein the second means (10) includes a memory circuit (11) for memorization of said characteristic signal and being connected to the first means (8), and an inhibiting circuit (12) connected to the memorization circuit (11) and to the first means (8) for furnishing said inhibiting signal at one output (17).

4. A device according to claim 2, further including means for cancelling the prohibition of the execution of said function, said means for cancelling having one output (15) connected to the input of the second means (10), said means for cancelling being arranged to furnish an output signal exhibiting said first level when after a resumption of voltage to the security device after a cutoff it is desirable to enable the execution of said function voltage, said means for cancelling including at least one input (16) for receiving a coded signal, upon the reception of which the output signal of said means for cancelling exhibits said first level.

5. A device according to claim 3, wherein the memorization circuit (11) is a multivibrator of the master-slave type.

6. A device according to claim 3, wherein the memorization circuit (11) includes a least one volatile memory.

7. A device according to claim 2, wherein the destruction means includes laser means for destroying the component at the end of said period by a laser beam directed at said component upon energization of the laser means.

8. A device according to claim 2, wherein the destruction means includes means for passing an excess current through the component.

9. A device according to claim 2, wherein the destruction means includes mechanical means for destroying the component by mechanical action.

10. A deice according to claim 1, wherein the power supply (3) of the processing unit (2) and of the device (11) is a battery.

11. A device according to claims 1, 2, 3, 4, 5, 6, 7, 8, 9 or 10, wherein the apparatus (2) is a microcircuit card having at least one microcircuit comprising at least one volatile memory.

12. A device according to claim 6 wherein said at least one volatile memory of the apparatus comprises the memorization circuit (11) of the second means (10).

13. A device according to claim 10 wherein the battery (3) is carried by the card.

* * * * *

UNITED STATES PATENT AND TRADEMARK OFFICE
CERTIFICATE OF CORRECTION

PATENT NO.  : 4,795,893
DATED       : January 3, 1989
INVENTOR(S) : UGON, Michel It is certified that error appears in the above-identified patent and that said Letters Patent is hereby corrected as shown below:

In the Abstract, line 17 "maintainin" should be --maintaining--.

Claim 4, line 2, after "means" insert --(14)--.

Claim 10, line 1, "deice" should be --device--.

Signed and Sealed this

Sixth Day of June, 1989

Attest:

DONALD J. QUIGG

Attesting Officer

Commissioner of Patents and Trademarks